US006318406B1

United States Patent
Conley

(10) Patent No.: US 6,318,406 B1
(45) Date of Patent: Nov. 20, 2001

(54) PILOT OPERATED RELIEF VALVE

(75) Inventor: Jeff A. Conley, Sugar Land, TX (US)

(73) Assignee: Tyco Flow Control, Inc., Houston, TX (US)

( * ) Notice: Subject to any disclaimer, the term of this patent is extended or adjusted under 35 U.S.C. 154(b) by 0 days.

(21) Appl. No.: 09/525,282

(22) Filed: Mar. 14, 2000

(51) Int. Cl.$^7$ .................................. F16K 31/12
(52) U.S. Cl. ..................... 137/491; 137/492; 251/38; 251/43
(58) Field of Search ................... 137/491, 492; 251/38, 43

(56) References Cited

U.S. PATENT DOCUMENTS

| 2,619,109 | 11/1952 | Garrett et al. . | | |
|---|---|---|---|---|
| 2,890,714 | 6/1959 | Greenwood et al. . | | |
| 3,294,111 | 12/1966 | Abercrombie et al. . | | |
| 3,477,456 | 11/1969 | Powell . | | |
| 3,592,224 | 7/1971 | Bois . | | |
| 4,172,466 | 10/1979 | Pattarini et al. . | | |
| 4,425,938 | 1/1984 | Papa et al. . | | |
| 4,586,533 | 5/1986 | Estes . | | |
| 4,615,356 | 10/1986 | Reip . | | |
| 4,705,065 | 11/1987 | McNeely et al. . | | |
| 4,722,361 | * | 2/1988 | Reip ..................................... | 137/488 |
| 4,791,955 | 12/1988 | Reip . | | |
| 4,905,727 | 3/1990 | Gavrila . | | |
| 4,917,144 | 4/1990 | Giles . | | |
| 4,957,136 | 9/1990 | Gavrila . | | |
| 5,555,910 | 9/1996 | Powell et al. . | | |
| 5,725,015 | 3/1998 | Theodos et al. . | | |
| 5,769,113 | 6/1998 | Alberts et al. . | | |
| 5,842,501 | 12/1998 | Powell et al. . | | |
| 6,039,070 | * | 3/2000 | Zaehe ................................... | 137/491 |
| 6,119,722 | * | 9/2000 | Zaehe ................................... | 137/494 |
| 6,161,570 | * | 12/2000 | McNeely .............................. | 137/491 |

* cited by examiner

Primary Examiner—A. Michael Chambers
Assistant Examiner—Thomas L. McShane
(74) Attorney, Agent, or Firm—Browning Bushman P.C.

(57) ABSTRACT

A pilot operated safety relief valve (14) having a main piston valve member (26). A dome chamber (42) is provided in the valve body (18) over piston valve member (26) and a cap (44) forms a closure for dome chamber (42). A pilot valve (46) is mounted on the cap (44) and has a diaphragm actuated fluid inlet sensing tube (60) received within a bore (30) of the piston valve member (26). Inlet fluid pressure is communicated through bore (61) of sensing tube (60) to the inlet fluid sensing chamber (84) on the outer side of diaphragm (65). Exhaust chamber (56) is positioned between dome chamber (42) and inlet sensing chamber (84). Adjustment spring (67) continuously urges O-ring (72) in dome chamber (42) to a seated position on seat (70). An annular clearance (78) is provided between sensing tube (60) and piston (26) for providing a restricted fluid flow between dome chamber (42) and the inlet (20).

21 Claims, 5 Drawing Sheets

PILOT OPERATED RELIEF VALVE

FIELD OF THE INVENTION

This invention relates to a pilot operated safety relief valve for a pressure vessel, and more particularly to such a pilot operated safety relief valve in which the pilot valve is an integral portion of the relief valve.

BACKGROUND OF THE INVENTION

Most pilot valves are mounted on the main relief valve with brackets and fluid pressure is transmitted to the pilot valve by suitable tubing. Pilot operated relief valves having tubing connections between the main valve body and the pilot valve body are subject to possible leakage and a high manufacturing cost.

In some instances, such as shown in U.S. Pat. Nos. 4,172,466 and 5,842,501, the pilot valve has been connected directly to the main valve body without the use of brackets and separate tubing lines between the pilot valve body and the main relief valve body. However, the pilot valve body is connected to the main valve body along planar or flat surfaces and possible leaks may occur along such faces or surfaces.

In some instances in which a plate-type main valve member having a diaphragm actuator is provided, a pilot valve has been mounted on a cap on the main valve body over the main diaphragm chamber with the plate-type main valve member connected directly to the diaphragm actuator.

It is desired that a pilot operated relief valve be provided in which the main valve member comprises a piston with a pilot valve axially mounted on a cap for the main valve body adjacent a dome chamber over the piston.

SUMMARY OF THE INVENTION

The present invention is particularly directed to a pilot operated safety relief valve in which the pilot valve is mounted on and supported by a cap on the valve body for the main relief valve. A dome chamber is provided adjacent the cap and the pilot valve extends axially of the main valve member.

The main valve member preferably comprises a piston having a central bore which receives an end portion of an inlet sensing tube and is mounted for reciprocal movement relative to the inlet sensing tube with the end portion of the inlet sensing tube remaining within the central bore. The inlet sensing tube is secured at its outer end to a pilot valve diaphragm and inlet fluid pressure is communicated by the inlet sensing tube to the upper outer side of the diaphragm. A dome chamber is provided between the piston and an end cap on the main valve body which supports the pilot valve. The sensing tube includes a pilot valve member which is positioned in the dome chamber and moves downwardly within the dome chamber upon the inlet fluid pressure reaching a predetermined high amount.

An adjustment spring continuously urges the sensing tube and pilot valve member in an upward position and the spring is positioned within the exhaust chamber between the dome chamber and the inlet sensing chamber. Thus, a single exhaust port for both the spring and exhaust chamber is provided and the normal outwardly extending spring bonnet is not needed. Since the pilot valve member is positioned in the dome chamber and the adjustment spring is positioned in the exhaust chamber between the inlet sensing chamber and the dome chamber, a highly compact pilot valve structure is provided with a minimum of porting between the chambers.

An annular restriction or clearance is provided between the sensing tube and the main piston valve member to provide a restricted fluid communication between the inlet fluid and the dome chamber during normal operation. Relative axial movement occurs between the piston valve member and the sensing tube so that adequate cleaning of the annular restriction is achieved.

Upon a predetermined inlet fluid pressure applied against the pilot valve diaphragm, the diaphragm and sensing tube secured thereto move downwardly against an adjustment spring in the exhaust chamber to an unseated open position of the pilot valve member which is mounted in the dome chamber to communicate the dome chamber to the exhaust chamber for reducing the dome fluid pressure. Upon a reduction in the dome fluid pressure so that the fluid pressure load under the piston is greater than the fluid pressure load over the piston, the piston is moved or lifted from its valve seat to an open position to permit fluid from the pressure vessel to flow from the outlet of the main valve body. Thus, the fluid pressure in the pressure vessel is relieved or reduced from a predetermined maximum amount. Upon a reduction in the inlet fluid pressure from the pressure vessel below a predetermined amount, the reduced inlet fluid pressure to the pilot diaphragm chamber results in return of the diaphragm and inlet sensing tube in an upward or outer direction to the seated closed position of the pilot valve member blocking fluid flow from the dome chamber to the exhaust chamber or vent. Inlet fluid pressure flow to the dome chamber through the relatively small annular clearance between the piston and sensing tube provides an increase in fluid pressure in the dome chamber for movement of the piston valve member toward a closed seated position. For a relatively small increase of inlet fluid pressure, a relatively small decrease of fluid pressure in the dome chamber results in a relatively small movement of the main piston valve member toward a open position. Since proportional increases or decreases in inlet pressure result in proportional decreases or increases in the dome fluid pressure acting against the piston, a modulating action of the pilot valve is provided.

The pilot valve of the present invention fully opens at a maximum 2.5 psig differential across the valve with the dome chamber vented to atmosphere. Such an arrangement is desired in blower applications as the pilot valve normally bypasses downstream piping to provide a low flowing resistance against blower startup.

Minimal frictional resistance is provided against movement of the main piston valve member toward an open position since there is no seal between the piston and sense tube; an annular clearance is provided between the piston and the inlet sensing tube. In addition, the piston is preferably made of a lightweight aluminum material and a U-cup seal activated by dome fluid pressure is provided between the piston and an outer liner to minimize friction during lift or movement of the piston toward an open position when dome pressure is exhausted and reduced to substantially zero pressure.

An object of the invention is to provide a pilot operated safety relief valve in which the pilot valve is integral with the main relief valve.

An additional object of the invention is to provide such a pilot operated safety relief valve having a modulated and flowing pilot valve.

Another object of the invention is to provide such a pilot operated safety relief valve having a strong and sturdy pilot valve particularly adapted for use in low pressure vibrating service, such as blower applications.

A further object is to provide a highly compact pilot valve for a safety relief valve in which the exhaust chamber is positioned between the dome chamber and the inlet fluid sensing chamber with the adjustment spring mounted in the exhaust chamber thereby to provide a minimum of porting between the chambers and a minimal height.

Another object is the provision of such a pilot valve in which an inlet fluid sensing tube secured to an outer diaphragm provides fluid communication of inlet fluid to the outer side of the diaphragm for urging the pilot valve member downwardly for movement to an open position within the dome chamber.

Other objects, features, and advantages of the invention will be apparent from the following specification and drawings.

DESCRIPTION OF THE INVENTION

Figure 1:
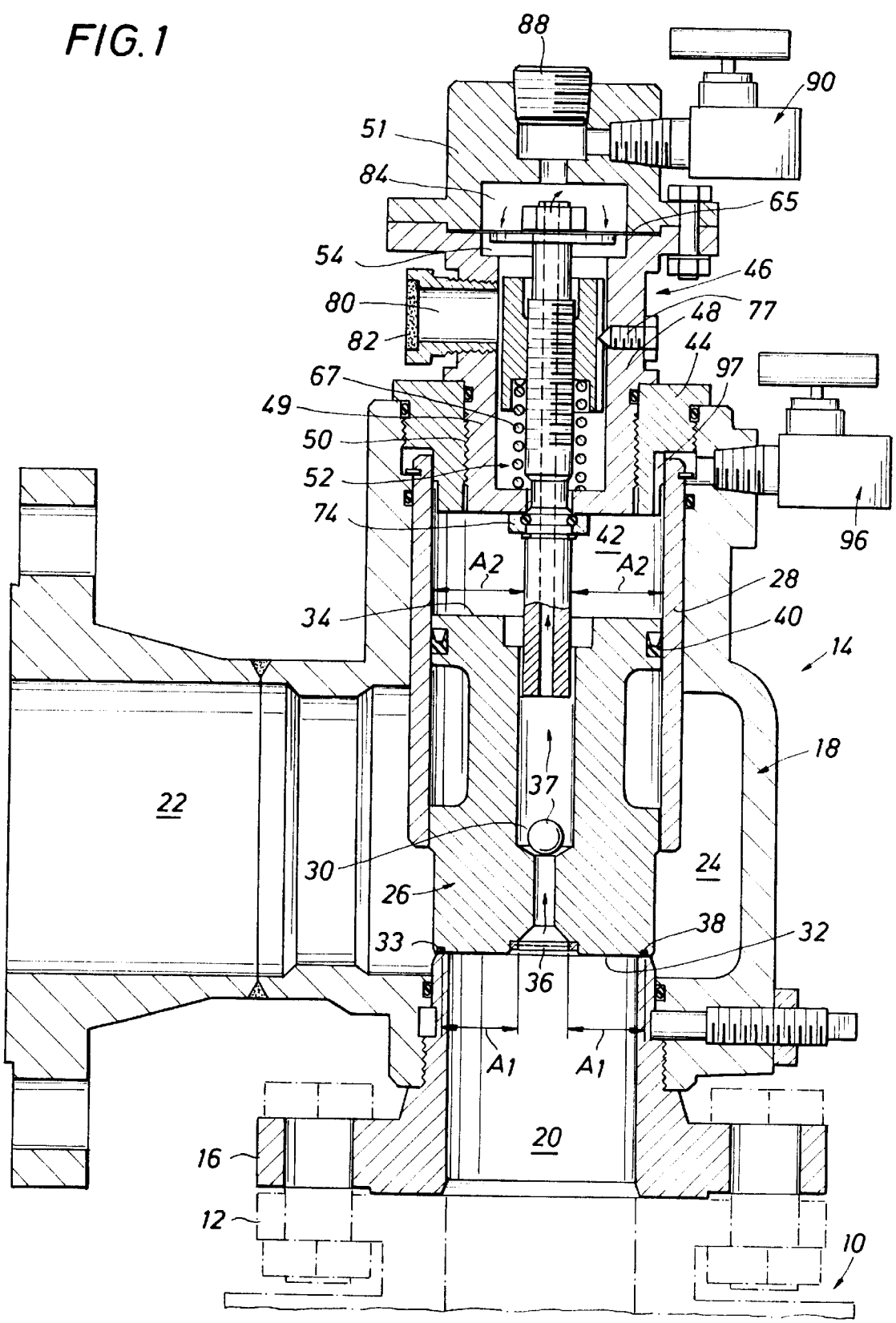
FIG. 1 is a longitudinal sectional view of a pilot operated safety relief valve comprising the present invention mounted on a pressure vessel and illustrating a pilot valve mounted on a cap closing the dome chamber of the main valve body.

Referring to the drawings, and particularly FIGS. 1–5, a pressure vessel, such as a tank, pipeline, or blower, for example, is partially shown at 10.

Figure 2:
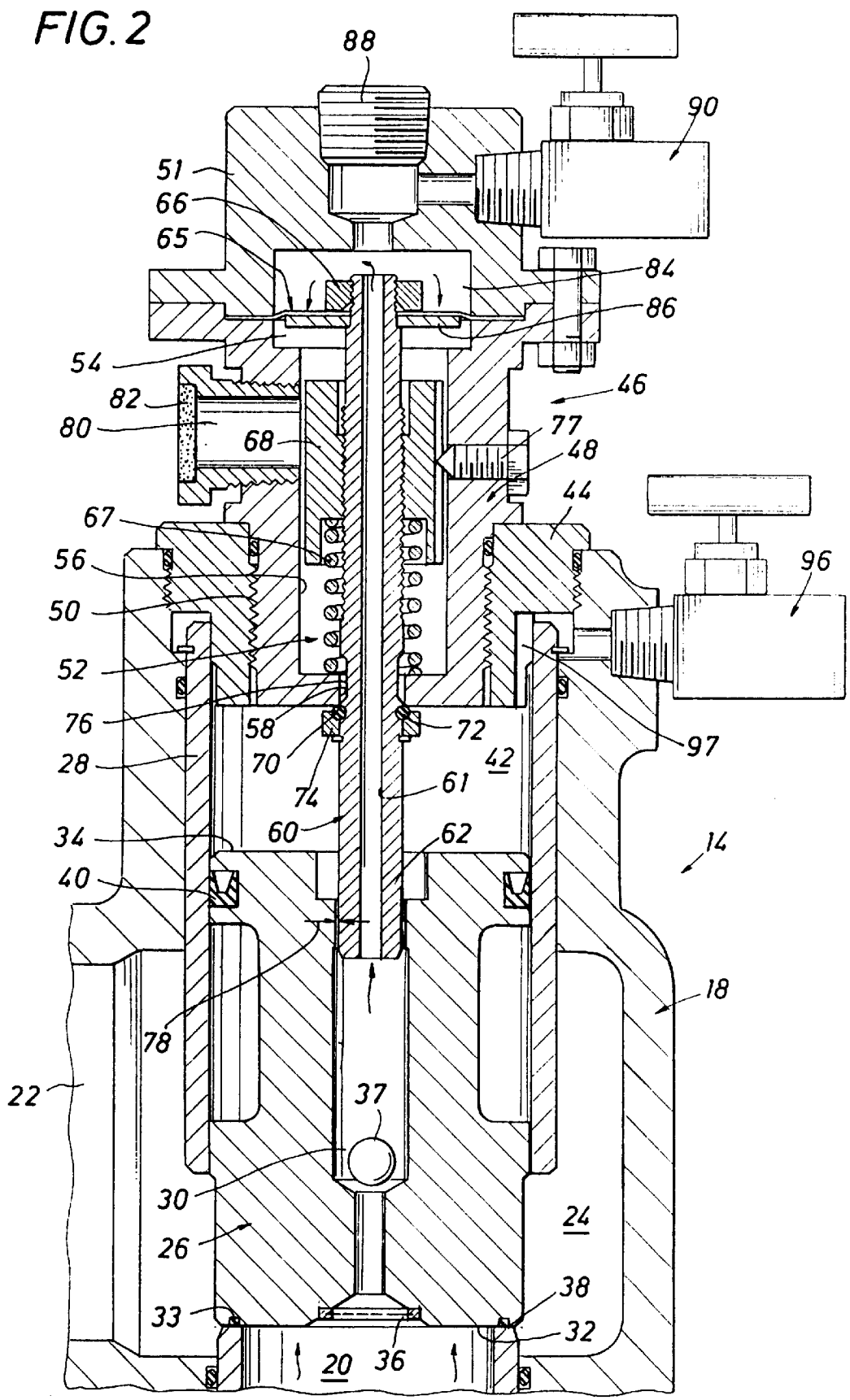
FIG. 2 is an enlarged fragment of FIG. 1 showing a main piston valve member in a closed position and receiving an inlet sensing tube to communicate inlet fluid pressure to a pilot diaphragm secured to the inlet sensing tube.

Pressure vessel 10 has an upper flange 12 and a main pressure relief valve as shown generally at 14 has a lower flange 16 connected to upper flange 12 of pressure vessel 10. Pressure relief valve 14 has a main valve body generally indicated at 18 including an inlet 20, an outlet 22, and a main valve chamber 24. The main relief valve comprises a piston or piston valve member 26 mounted for reciprocal movement within liner 28 in main valve body 18. Piston 26 has a central bore generally indicated at 30 between inner or lower end face 32 and outer or upper end face 34. A screen 36 adjacent the inner end of bore 30 acts as a filter for inlet fluid and a ball check 37 is mounted in bore 30. Lower face 32 has an O-ring 33 and seats on seat 38 in a closed normal operating condition as shown in FIGS. 1 and 2. Ball check 37 is effective to block fluid flow between central bore 30 and piston face 32 when the pilot is being field tested. A U-cup seal 40 is mounted between piston 26 and liner 28.

A dome chamber 42 is provided in liner 28 adjacent outerface 34 and an end cap 44 is threaded within body 18 to form a closure for dome chamber 42. Fluid pressure area A2 acting on outer face 34 as shown in FIG. 1 is larger than fluid pressure area A1 acting on inner face 32 thereby to provide a fluid pressure differential with dome pressure in dome chamber 42 maintaining piston 26 in a closed position during normal operating conditions.

A pilot valve is shown generally at 46 having a pilot valve body 48 threaded at 50 to cap 44 on main valve body 18. An outer pilot valve cap 51 is secured to body 48. Pilot valve 46 thus extends axially of main piston valve member or piston 26 and is mounted on cap 44 so that pilot valve 46 is formed integrally with main pressure relief valve 14. Pilot valve body 48 has a central bore generally indicated at 52 including an outer large diameter bore portion 54, an intermediate bore portion 56 of an intermediate diameter forming an exhaust chamber, and a lower small diameter bore portion 58. In some instances, it may be desirable to form cap 44 as an integral part of body 48.

An inlet fluid sensing tube generally indicated at 60 has a lower end portion 62 received within bore 30 of piston 26 and extends through pilot bore portions 54, 56 and 58. The inlet sensing tube 60 has a central bore 61 extending through its entire length. The outer end of sensing tube 60 is secured to a diaphragm generally indicated at 65 by a nut 66 threaded onto the end of sensing tube 60. An adjustment spring 67 mounted in pilot bore portion 56, which forms an exhaust chamber, extends about tube 60 and a spring adjustment nut 68 is threaded about tube 60 to provide a predetermined load on spring 67. Spring 67 continuously urges sensing tube 60 and pilot diaphragm 65 upwardly. A screw 77 maintains nut 68 in position and may fit in teeth on the outer periphery of nut 68 to prevent rotation.

Figure 3:
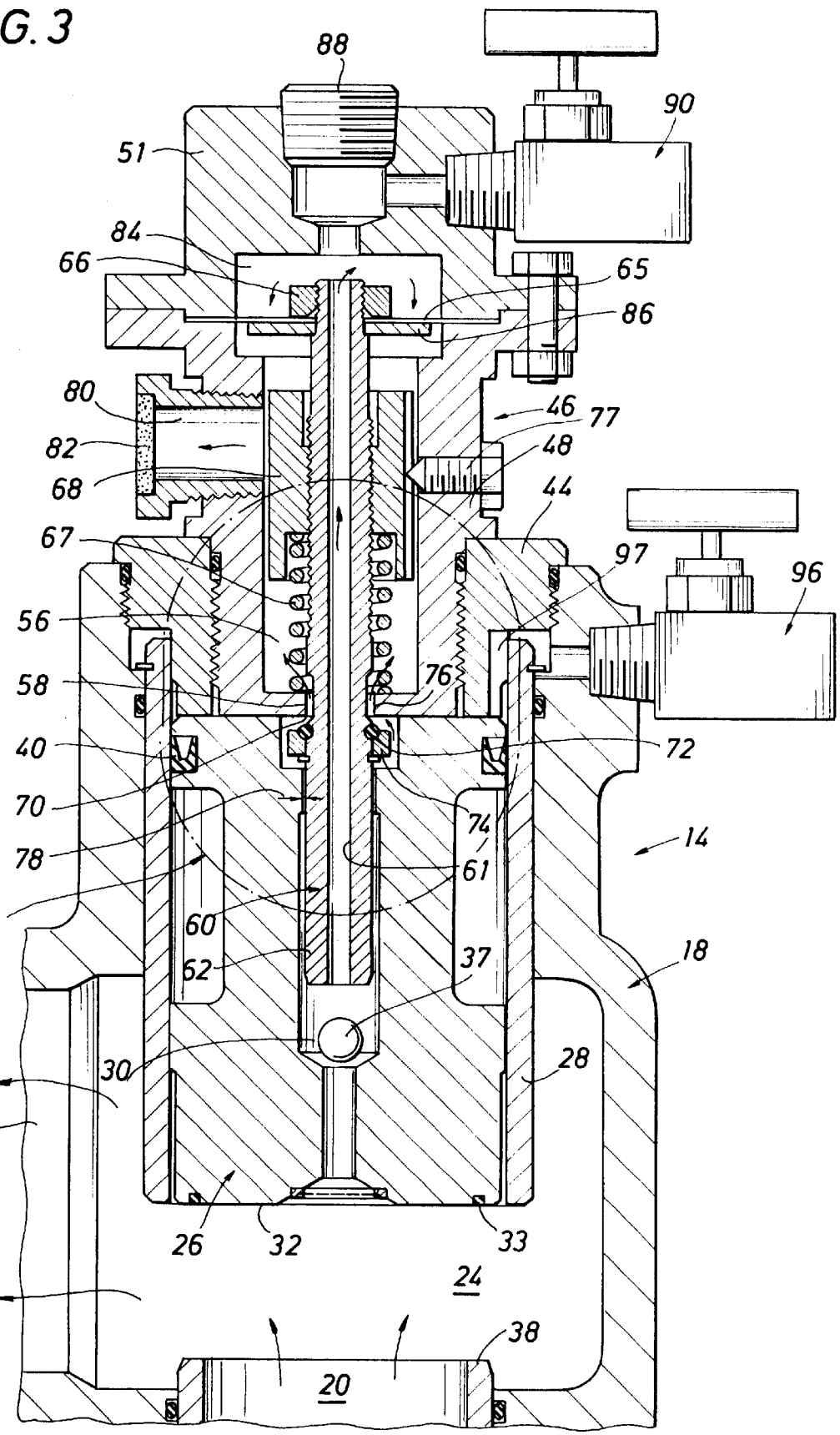
FIG. 3 is an enlarged fragment of FIG. 1 similar to FIG. 2 but showing the main piston valve member in an open pressure relief position with fluid pressure in the dome chamber exhausted to atmosphere.
Figure 4:
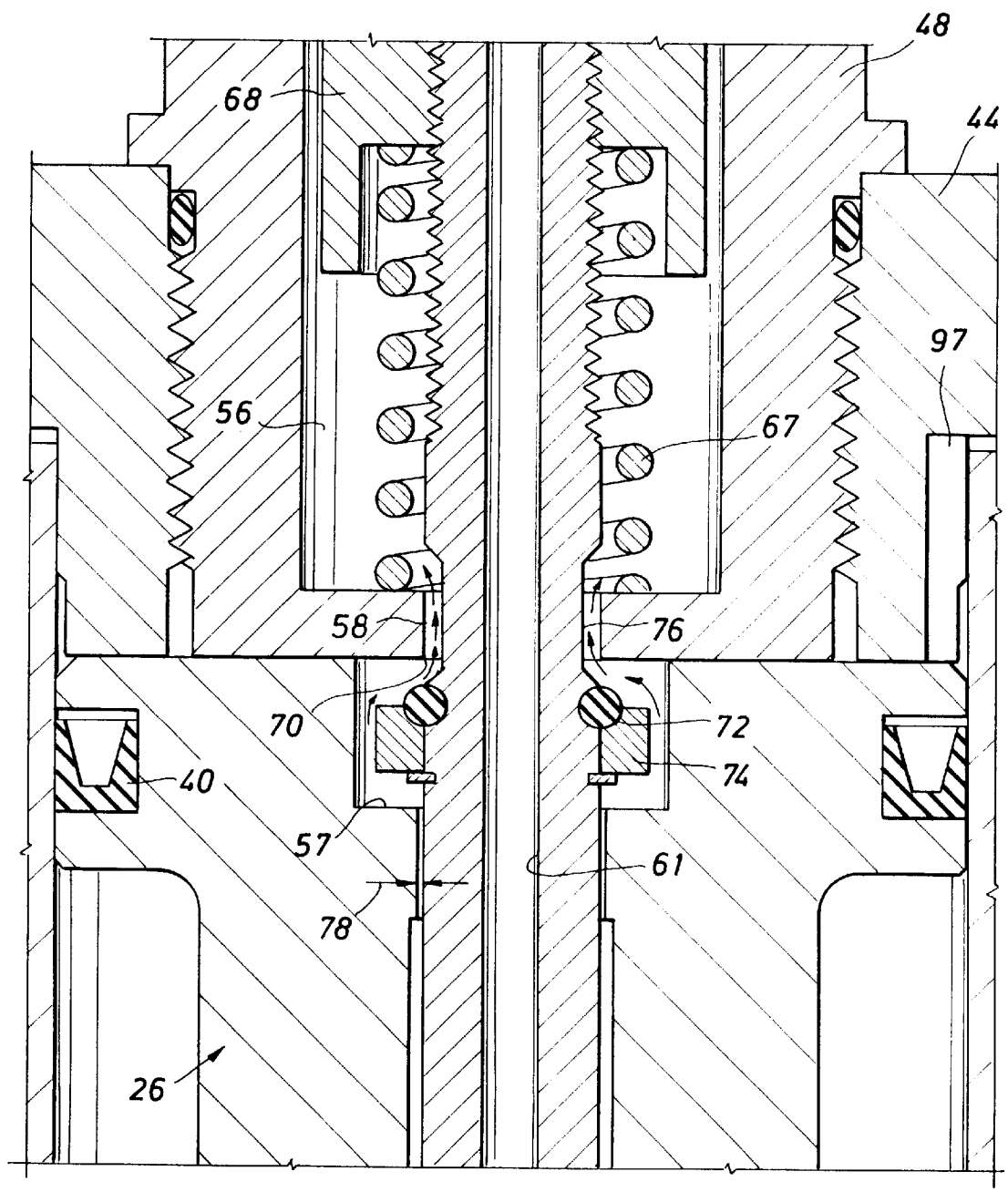
FIG. 4 is an enlarged fragment of FIG. 3 showing the open position of the pilot valve member for venting the fluid pressure in the dome chamber to the exhaust chamber and vent.
Figure 5:
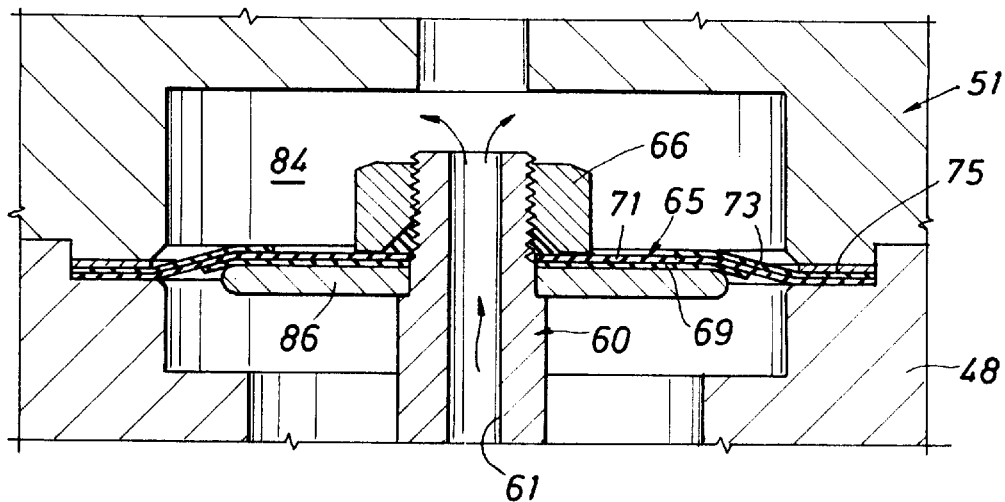
FIG. 5 is an enlarged sectional view of the pilot diaphragm secured to the outer end of the inlet sensing tube.

As shown particularly in FIGS. 3 and 4, pilot valve body 48 has an inner seat 70 defined by lower bore portion 58 and an O-ring 72 secured by retainer ring 74 on tube 60 defines a pilot valve member and is continuously urged by spring 67 into seated position on seat 70. Tube 60 has a reduced diameter portion 76 received within inner small diameter bore portion 58 of pilot body 48 to permit fluid flow past seat 70 when O-ring 72 is unseated. A small annular clearance or restriction shown at 78 in FIGS. 3–5 is provided between sensing tube 60 and piston 26 to permit a restricted fluid communication between dome chamber 42 and inlet fluid pressure in piston bore 30. Relative axial movement between sensing tube 60 and piston 26 acts to provide a cleaning of annular restriction 78. Upon unseating or opening of the pilot valve member defined by O-ring 72 and sensing tube 60, fluid from dome chamber 42 is exhausted through exhaust chamber 56 and exhaust or vent port 80 having an outer filter screen 82. An enlarged diameter bore portion 57 in piston 26 is provided to receive O-ring 72 and retainer ring 74.

As shown also in FIG. 5, pilot cap 51 and pilot body 48, having an elastomer gasket 75 therebetween, grip diaphragm 65 along the outer marginal portion thereof. An inlet fluid sensing chamber 84 is defined by cap 51 on the outer side of diaphragm 65. Nut 66 grips diaphragm 65 against a metal plate 86 mounted on sensing tube 60. Diaphragm 65 include a main diaphragm member 71 and an inner diaphragm member slip ring 69 positioned between main diaphragm member 71 and plate 86 with an outer free marginal portion of slip ring 69 extending beyond plate 86. Inner diaphragm member 69 is not secured to main diaphragm member 71 and provides a smooth, low friction surface over which diaphragm member 71 can slide upon movement of sensing tube 60 thereby to protect diaphragm member 71 from rubbing on plate 86 and incurring wear.

An upper check or auxiliary diaphragm member 73 is mounted over main diaphragm member 71 and extends from gasket 75 to a position intermediate the width of main diaphragm member 71. Auxiliary diaphragm member is not secured to main diaphragm member 71. In the event main diaphragm member 71 cracks or ruptures, auxiliary diaphragm member 73 will bridge and seal across the defect and allow the pilot valve to open at its predetermined pressure setting. Members 69, 71 and 73 are preferably formed of Teflon.

An end plug 88 is mounted on cap 51 to close inlet sensing chamber 84. A field test valve 90 in fluid communication with inlet fluid sensing chamber 84 is provided to test the opening of the main piston valve member 26 at a predetermined fluid pressure from a test fluid source. Upon the application of a test fluid pressure from test valve 90, check ball 37 is seated in bore 30 and fluid pressure in diaphragm chamber 84 is increased to move diaphragm 65 and sensing tube 60 downwardly for unseating O-ring 72 thereby to permit the exhaust of fluid from dome chamber 42 resulting in opening of the main piston valve member 26. Thus, the fluid pressure at which the pressure relief valve opens may be tested.

A manually operated normally closed blowdown valve 96 is mounted on main valve body 18 and may be opened to atmosphere to allow the pressure in the main valve dome chamber 42 to escape through slot 97. This will allow the main valve piston 26 to rise and vessel pressure to reduce. This feature is desired so the piston valve member 26 can be opened manually and release pressure so to reduce start-up resistance on a blower. This feature also confirms the operability of the main piston valve member 26.

Operation

Referring now to FIGS. 1 and 2 in which the main piston valve member 26 is in seated position on seat 38, adjustment nut 68 has been adjusted to exert a predetermined load on spring 67 to urge O-ring 72 on sensing tube 60 into sealing engagement with seat 70 when the inlet fluid pressure is below a predetermined maximum pressure, and for unseating O-ring 72 at a cracking fluid pressure of pilot valve 46 for opening of main piston relief valve member 26 at a predetermined set pressure of relief valve 14. Upon the inlet fluid pressure in inlet 20 from pressure vessel 10 reaching a predetermined fluid pressure communicated through bore 61 of sensing tube 60 to pilot diaphragm chamber 84, diaphragm 65 and sensing tube 60 move downwardly for unseating of O-ring 72 to permit the exhaust of fluid from dome chamber 42 to exhaust chamber 56 and exhaust port 80. Upon a reduction in the fluid pressure in dome chamber 42, the pressure load under piston 26 acting on area A1 become greater than the pressure load above piston 26 acting on area A2, and piston 26 will be lifted or unseated so that inlet fluid pressure from pressure vessel 10 and inlet 20 will flow through outlet 22 of the main pressure relief valve 14. The pressure at which piston 26 is unseated comprises the set pressure of pressure relief valve 14.

While piston 26 is shown in FIGS. 3 and 4 in a full open position, piston 26 is designed for positioning at various open positions upon proportional increases in inlet pressure resulting from proportional reductions in dome pressure in dome chamber 42 thereby to provide proportionate increases in the lift applied to piston 26 to permit a modulating action resulting from pilot valve 46.

It is desirable, particularly is blower applications, that there be low flow resistance during blower startup. This has been achieved in the invention by providing a piston 26 that will readily rise when there is no dome fluid pressure. Piston 26 is formed from a lightweight material, preferably aluminum. Further, the piston U-cup seal 40 is pressure activated. Thus, when the dome fluid pressure is substantially zero, there is minimal friction load placed on liner 28, and piston 26 is allowed to float freely.

Upon a reduction in the inlet fluid pressure in pilot diaphragm chamber 84 from relief of the fluid pressure in pressure vessel 10, diaphragm 65 and sensing tube 60 move upwardly for reseating of O-ring 72 on seat 70 thereby to block fluid communication between dome chamber 42 and exhaust chamber 56. The relatively small annular clearance 78 between tube 60 and piston 26 permits a restricted flow of inlet fluid from piston bore 30 to dome chamber 42 to provide a build up of fluid pressure in dome chamber 42 thereby to move piston 26 downwardly to a seated position on seat 38 upon the fluid pressure in pressure vessel 10 returning to the predetermined operating pressure. A varying inlet fluid pressure above the cracking fluid pressure of pilot valve 46 but below a fluid pressure which results in full opening of main piston valve member 26 will provide a modulating action of main valve member 26.

Pilot operated pressure relief valve 14 is particularly utilized on gas distribution pipelines or on positive displacement blowers as a low pressure modulating pilot valve operating between 5 psig and 150 psig although relief valve 14 would be suitable at pressures above 150 psig. The main relief valve member 26 comprises a piston and the pilot valve is mounted axially of the piston on a cap for the dome chamber of the main valve body thereby resulting in minimal potential fluid leakage areas and also relatively low manufacturing costs. The present invention provides a modulating and flowing pilot valve which is very sturdy and can be used in low pressure vibrating services such as blower applications, for example.

Figure 6:
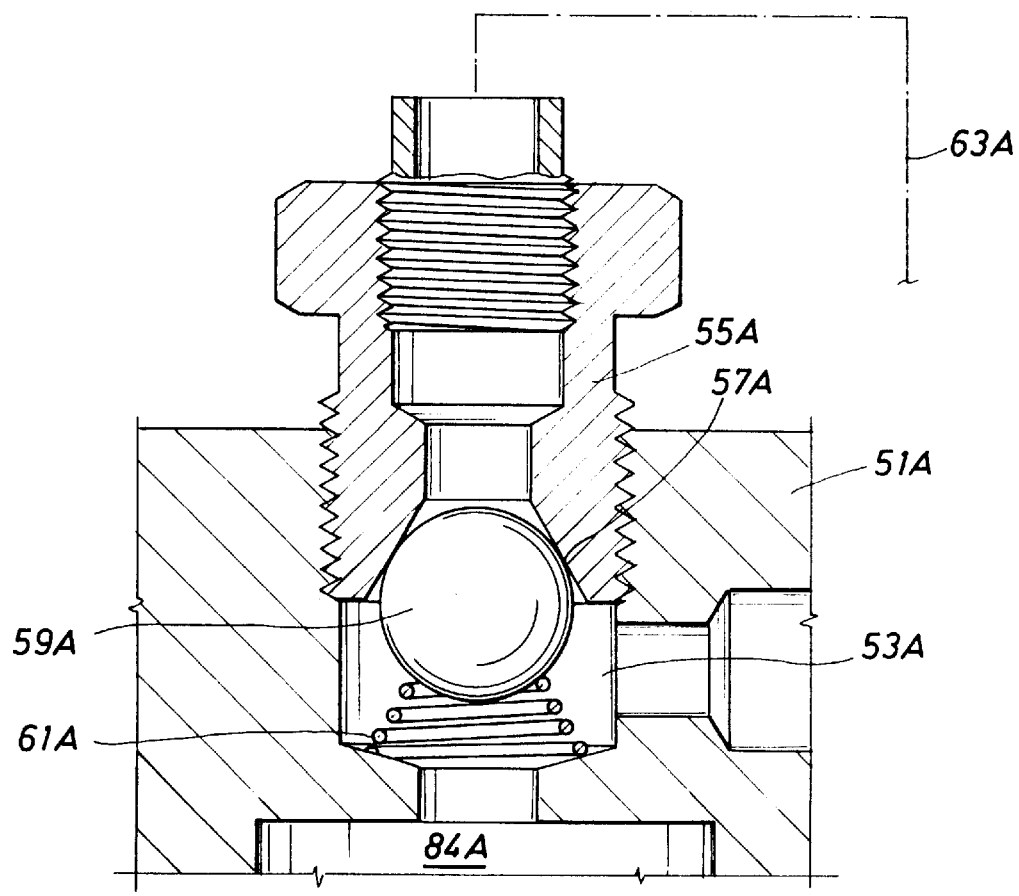
FIG. 6 is an enlarged sectional view of a modification in which an auxiliary inlet sensing line is provided between the pilot diaphragm chamber and pressure vessel to insure that an accurate inlet sensing pressure is communicated to the pilot diaphragm chamber at all times.

Modification of FIG. 6

Referring to FIG. 6, a modified arrangement is shown to provide a separate fluid inlet sensing line for inlet fluid diaphragm sensing chamber 84A. Pilot cap 51A has a bore 53A therein with a plug 55A threaded within bore 53A and having an O-ring check valve seal 57A. Ball check member 59A is continuously urged by spring 61A into a seated closed position against conical surface 57A. A separate fluid inlet sensing line shown at 63A extends to pressure vessel 10 to provide direct communication between pressure vessel 10 and diaphragm sensing chamber 84A. In the event the inlet fluid pressure through sensing tube 60 as shown in the embodiment of FIGS. 1–5 is less than the inlet fluid pressure in line 63A, check valve 59A will unseat and permit the communication of inlet fluid to pilot diaphragm chamber 84A. Thus, operation of the main relief valve 14 will be maintained for opening at the predetermined set pressure even though possible pressure losses may occur in the inlet fluid pressure flowing through the pilot valve.

From the above, it is apparent that a compact diaphragm operated pilot valve for a safety relief valve has been provided of a minimal height with the exhaust chamber 56 positioned between the fluid inlet sensing chamber 84 and the dome chamber 42. The fluid inlet sensing chamber 84 is positioned outwardly of the diaphragm 65 and fluid sensing tube 60 is secured to diaphragm 65. Adjusting spring 67 within exhaust chamber 56 continuously urges the sensing tube 60 outwardly for seating O-ring 72 against seat 70 within dome chamber 42. A single exhaust 80 is effective for exhaust chamber 56, which also acts as a spring chamber.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A valve assembly for relieving the fluid pressure in a pressure vessel comprising:
   a main body having an inlet, a main valve chamber, and an outlet;
   a main fluid responsive valve member mounted in said main valve chamber for reciprocal movement between open and closed positions relative to said inlet for fluid pressure relief of said pressure vessel;
   a dome chamber adjacent an outer end of said fluid responsive valve member; and
   a pilot valve structure mounted on said main body in axial alignment with said fluid responsive valve member and forming an outer end of said dome chamber;
   said pilot valve structure including a diaphragm and an inlet fluid sensing tube secured to said diaphragm for movement with said diaphragm, said inlet fluid sensing tube having an inner end in fluid communication with said inlet and an outer end extending through said diaphragm and in fluid communication with an outer side of said diaphragm to provide an inlet fluid sensing chamber on said outer side of said diaphragm.

2. A valve assembly as defined in claim 1 wherein said fluid responsive valve member comprises a piston.

3. A valve assembly as defined in claim 2, wherein said piston has a central bore extending therethrough in fluid communication with said inlet, and
   said inner end of said sensing tube is received within said central bore.

4. A valve assembly as defined in claim 3, wherein an annular restriction is provided between said sensing tube and the inner periphery of said central bore in said piston to permit restricted fluid flow between said inlet and said dome chamber.

5. A valve assembly as defined in claim 1, further comprising, an exhaust chamber between said dome chamber and said inlet fluid sensing chamber and a pilot valve member mounted on said sensing tube and positioned within said dome chamber for sealing between said dome chamber and said exhaust chamber.

6. A valve assembly as defined in claim 5, further comprising,
   an adjustment spring mounted within said exhaust chamber for continuously urging said sensing tube and pilot valve member thereon in an outer direction.

7. A valve assembly as defined in claim 6, further comprising, an adjusting nut threaded on said sensing tube for adjusting the force exerted by said spring.

8. A valve assembly as defined in claim 1, further comprising,
   a cap mounted on said main body, said pilot valve structure mounted on said cap.

9. A valve assembly for relieving the fluid pressure in a pressure vessel comprising:
   a main body having an inlet, a main valve chamber, and an outlet;
   a piston mounted in said main valve chamber for reciprocal movement between open and closed positions relative to said inlet for fluid pressure relief of said pressure vessel;
   a dome chamber adjacent an outer end of said piston; and
   a pilot valve structure mounted on said main body in axial alignment with said piston and forming an outer end of said dome chamber; said pilot valve structure including a diaphragm, an inlet fluid sensing chamber on one side of said diaphragm, an exhaust chamber between said inlet fluid sensing chamber and said exhaust chamber, and a fluid inlet sensing member extending from said piston to said inlet fluid sensing chamber;
   said piston having a central bore therein in fluid communication with said inlet, and said fluid inlet sensing member having a lower end portion received within said central bore communicating inlet fluid to said inlet fluid sensing chamber.

10. A valve assembly as defined in claim 9 wherein an annular restriction is provided between said sensing member and the inner periphery of said central bore in said piston to permit restricted fluid flow between said inlet and said dome chamber.

11. A valve assembly as defined in claim 9 wherein said fluid inlet sensing member is secured to said diaphragm for movement therewith, and
    a spring is mounted in said exhaust chamber for continuously urging said diaphragm and sensing member upwardly.

12. A valve assembly as defined in claim 9, further comprising, a pilot valve member mounted on said fluid inlet sensing member within said dome chamber and movable between seated and unseated positions to control the flow of fluid between said exhaust chamber and said dome chamber.

13. A pilot valve structure arranged for mounting on an end cap adjacent a dome chamber on a valve body for a main safety relief valve; said pilot valve structure comprising:
    pilot valve body having an opening therein;
    a sensing tube for inlet fluid extending through said opening and having a lower end portion extending through said dome chamber to said main safety relief valve;
    a diaphragm secured to an upper end portion of said sensing tube;
    an inlet fluid sensing chamber adjacent an outer side of said diaphragm;
    an exhaust chamber in said valve body between said inlet fluid sensing chamber and said dome chamber including an exhaust port; and
    a pilot valve member within said dome chamber between said sensing tube and said pilot valve body movable between seated and unseated positions to control the flow of fluid between said exhaust chamber and said dome chamber of the main safety relief valve.

14. The pilot valve structure as defined in claim 13, further comprising,
    a pilot valve seat defined about said opening in said pilot valve body; and
    said pilot valve member comprises an O-ring mounted about said sensing tube for movement between seated and unseated positions on said pilot valve seat upon axial movement of said sensing tube.

15. The pilot valve structure as defined in claim 14, further comprising,
    an adjustable spring member in said exhaust chamber urging said sensing tube in an outer direction to a seated position of said pilot valve member under a predetermined force.

16. The pilot valve structure as defined in claim 15, further comprising, a force adjusting nut in said exhaust chamber threaded onto said sensing tube and engaging said spring member to adjust the force of said spring urging said pilot valve member to a seated position.

17. The pilot valve structure as defined in claim 13, further comprising, an outer cap secured to said body and gripping said diaphragm therebetween, a plate on said tube for supporting said diaphragm;

a nut threaded onto said tube for clamping said diaphragm between said nut and said plate;

said diaphragm comprising a main diaphragm member extending radially inwardly to said plate and clamped radially outwardly between said cap and body, an inner diaphragm member between said main diaphragm member and said plate having a free outer marginal portion extending radially outwardly from said plate, said main diaphragm member and said inner diaphragm member being unsecured to each other with said inner diaphragm member forming a smooth, low friction surface over which said main diaphragm member may slide during movement of said diaphragm.

18. A pilot valve structure as defined in claim 17, further comprising, an outer diaphragm member over said main diaphragm member clamped between said cap and said body, said outer diaphragm member extending over said outer diaphragm member and having a free inner marginal portion extending to a position at least lapping said plate, said outer diaphragm member being unsecured to said main diaphragm member and acting to seal against said main diaphragm member.

19. A fluid pressure relief valve for relieving the fluid pressure in a pressure vessel comprising:

a main body having an inlet, a main valve chamber, and an outlet;

a main piston valve member mounted in said main valve chamber for reciprocal movement between open and closed positions relative to said inlet for fluid pressure relief of said pressure vessel, said piston valve member being of a generally cylindrical shape and having an axial bore therethrough;

a cap mounted on said main body in opposed relation to said outer end of said piston valve member, said cap having a central opening therein in axial alignment with said axial bore of said piston valve member;

a dome chamber formed between said cap and said outer end of said piston valve member; and a pilot valve mounted on said cap and having an inlet fluid sensing tube extending through said central opening in said cap and into said axial bore of said piston valve member with a restricted annular clearance between said tube and said piston valve member to permit a restricted inlet fluid flow from said inlet to said dome chamber.

20. A fluid pressure relief valve as defined in claim 19, further comprising, a cylindrical liner mounted in said main valve chamber and receiving said main piston valve member therein for reciprocal movement.

21. A fluid pressure relief valve as defined in claim 20, further comprising, a U-cup seal between said main piston valve member and said liner activated in an expanded relation from fluid pressure in said dome chamber and providing a relatively low frictional contact against said liner during movement of said piston valve member to open position upon exhaust of fluid from said dome chamber.

* * * * *